No. 787,001. PATENTED APR. 11, 1905.
J. SANDERS.
COMPOSITION OF MATTER FOR SOUND RECORD TABLETS.
APPLICATION FILED JAN. 20, 1904.
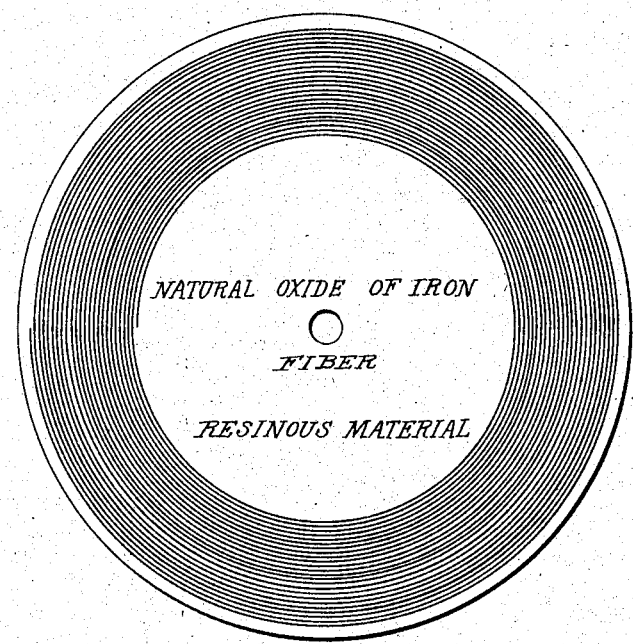
Witnesses.
Edwin L. Yewell.
F. T. Chapman.
Inventor.
Joseph Sanders,
By Lyons & Bissing,
Attorneys.

No. 787,001.

Patented April 11, 1905.

UNITED STATES PATENT OFFICE.

JOSEPH SANDERS, OF WASHINGTON, DISTRICT OF COLUMBIA.

COMPOSITION OF MATTER FOR SOUND-RECORD TABLETS.

SPECIFICATION forming part of Letters Patent No. 787,001, dated April 11, 1905.

Application filed January 20, 1904. Serial No. 189,889.

*To all whom it may concern:*

Be it known that I, JOSEPH SANDERS, a citizen of the United States, and a resident of Washington, in the District of Columbia, have invented certain new and useful Improvements in Compositions of Matter, of which the following is a specification.

My invention has reference to a new composition of matter which is particularly adapted for the manufacture of sound-record tablets which are designed to receive the impress of a sound-record matrix, whereby in the tablet the sound-record appears either as a groove of even depth, but laterally undulating to represent the sound-waves, or as a groove of varying depth, in which case the variations of depth represent the sound-waves. More particularly is the new material designed for use in the formation of sound-record tablets of the gramophone type, and I have found that gramophone-tablets made of this material are particularly durable, that the reproduced sounds which they yield are largely free of the muffled quality which is so characteristic of the sounds yielded by other record-tablets, and that the scratching noises due to the coaction of the style with the record material become fainter by continued use, whereas with other record-tablets they become more and more intensified by continued use.

Another important feature of my new composition of matter is that when used for a sound-record tablet it is found that the friction between the style and the tablet is remarkably less than with tablets heretofore used and diminishes by continued use instead of increasing by use, as is the case with other sound-record tablets. As a result of this property of my composition of matter, sound-record tablets made of the same do not cause the style to drag.

In the accompanying drawing, which forms a part of this specification, is shown a diagrammatic face view of a gramophone record-tablet in the construction of which my new composition of matter is designed to be used.

My new composition of matter consists of an intimate mixture of an oxid or oxids of the metals of the iron group, by preference the natural oxid of iron, an animal or vegetable fiber, such as cotton or wool flock or wood fiber, and a resinous binding material, such as shellac or rosin, or both, or other resins. The proportions of these ingredients may vary considerably; but I have found that for the production of sound-record tablets the following proportions yield excellent results, namely: natural oxid of iron, thirty parts, by weight; fiber, three and one-half parts, by weight; resinous material, twenty parts, by weight. These ingredients are marked on the drawing; but, as will presently appear, I am not confined to these specific substances or to the use of all of them.

Instead of oxid of iron I may use an oxid of manganese or an oxid of nickel, all of which belong to the iron group of metals, or I may use mixtures of any desired proportion of these oxids; but I have found that the natural oxid of iron gives particularly good results.

The oxid of iron or other oxid is used in finely-powdered condition, and the fiber is also rather finely divided. These ingredients are thoroughly mixed and kneaded together with the application of heat until the whole mass assumes the consistency of a rather stiff dough. When thus thoroughly mixed and kneaded, the mass is pressed, rolled, or otherwise shaped into the desired form and allowed to cool. At ordinary temperatures this mass is very hard, but can be softened by moderate heat sufficiently to receive a clear and sharp impression from a gramophone-matrix.

Any suitable coloring-matter may be used in connection with the ingredients which I have named; but the oxids of the metals themselves may be properly chosen to give quite a variety of colors. Thus, for instance, when the native oxid of iron alone is used the composition of matter will be reddish in color; if manganese oxid (dioxid) alone is used, the color of the composition of matter will be very nearly black, while a mixture of these two oxids will give intermediate colors.

I have found that I may dispense with the use of flock and still secure in a great measure the advantages which my composition has over compositions heretofore used in the manufacture of sound-record tablets.

I claim as my invention—

1. As a material for sound-record tablets, the composition of matter consisting of an oxid or oxids of one or more metals of the iron group and a resinous binding material, substantially as described.

2. As a material for sound-record tablets, the composition of matter consisting of natural oxid of iron and a resinous binding material, substantially as described.

3. As a material for sound-record tablets, the composition of matter consisting of natural oxid of iron and shellac, substantially as described.

4. As a material for sound-record tablets, the composition of matter consisting of an oxid or oxids of one or more metals of the iron group, fiber, and a resinous binding material, substantially as described.

5. As a material for sound-record tablets, the composition of matter consisting of natural oxid of iron, fiber, and a resinous binding material, substantially as described.

6. As a material for sound-record tablets, the composition of matter consisting of natural oxid of iron, fiber, and shellac, substantially as described.

7. As a material for sound-record tablets, the composition of matter consisting of natural oxid of iron, fiber, and a binder composed of shellac and rosin, substantially as described.

8. A sound-record tablet consisting of a body composed of oxid or oxids of one or more metals of the iron group and a resinous binding material, and having a sound-record groove formed in its surface, substantially as described.

9. A sound-record tablet consisting of a body composed of oxid or oxids of one or more metals of the iron group, fiber, and a resinous binding material, and having a sound-record groove formed in its surface, substantially as described.

10. A sound-record tablet consisting of a body composed of natural oxid of iron and a resinous binding material, and having a sound-record groove formed in its surface, substantially as described.

11. A sound-record tablet consisting of a body composed of natural oxid of iron and shellac, and having a sound-record groove formed in its surface, substantially as described.

12. A sound-record tablet consisting of a body composed of an oxid or oxids of one or more metals of the iron group, fiber and a resinous binding material, and having a sound-record groove formed in its surface, substantially as described.

13. A sound-record tablet consisting of a body composed of natural oxid of iron, fiber and a resinous binding material, and having a sound-record groove formed in its surface, substantially as described.

14. A sound-record tablet consisting of a body composed of natural oxid of iron, fiber and shellac, and having a sound-record groove formed in its surface, substantially as described.

15. A sound-record tablet consisting of a body composed of natural oxid of iron, fiber and a binder of shellac and rosin, and having a sound-record groove formed in its surface, substantially as described.

In testimony whereof I have signed my name to this specification in the presence of two subscribing witnesses.

JOSEPH SANDERS.

Witnesses:
JAS. WM. EWART,
W. HAWKE.